United States Patent [19]

Hargrove

[11] Patent Number: 4,990,049

[45] Date of Patent: Feb. 5, 1991

[54] UNIVERSAL PICKUP TRUCK BED LINER, LOADING RAMP AND LADDER ASSEMBLY

[76] Inventor: James F. Hargrove, Rt. 2 Box 89, Hope Hull, Ala. 36043

[21] Appl. No.: 261,745

[22] Filed: Oct. 25, 1988

[51] Int. Cl.$^5$ ............................................. B65G 67/02
[52] U.S. Cl. ..................... 414/537; 182/118; 182/129; 182/178; 182/222; 280/404; 280/491.5
[58] Field of Search ............ 414/522, 537, 538; 296/26, 37.6; 280/404, 414.2, 490.1, 491.5; 182/118, 119, 230, 222, 178, 129

[56] References Cited

U.S. PATENT DOCUMENTS

| 840,636 | 1/1907 | Lillow | 182/178 |
|---|---|---|---|
| 3,336,999 | 8/1967 | McSwain | 182/20 |
| 3,613,920 | 10/1971 | Flamm | 414/537 |
| 3,642,156 | 2/1972 | Stenson | 414/537 |
| 3,687,314 | 8/1972 | Haugland | 414/522 |
| 3,703,939 | 11/1972 | Maxwell | 182/178 X |
| 3,737,058 | 6/1973 | Johnson | 414/537 |
| 3,870,170 | 3/1975 | Noble et al. | 414/537 |
| 3,989,148 | 11/1976 | Donohue | 414/537 |
| 4,060,150 | 11/1977 | Hughes | 182/178 X |
| 4,070,030 | 1/1978 | Clark | 414/537 X |
| 4,078,678 | 3/1978 | Tordella | 414/537 |
| 4,078,821 | 3/1978 | Kitterman | 280/490.1 X |
| 4,126,206 | 11/1978 | Becnel | 182/230 X |
| 4,249,683 | 2/1981 | Park | 224/42.12 |
| 4,290,728 | 9/1981 | Leduc | 224/42.12 |
| 4,311,208 | 1/1982 | Macrorie et al. | 182/129 X |
| 4,333,678 | 6/1982 | Munoz et al. | 296/39.2 |
| 4,469,193 | 9/1984 | Rumsey, Jr. | 182/118 X |
| 4,478,549 | 10/1984 | Stelly et al. | 414/537 |
| 4,571,144 | 2/1986 | Guidry et al. | 414/537 |
| 4,596,417 | 6/1986 | Bennett | 414/537 X |
| 4,601,632 | 7/1986 | Agee | 414/537 |
| 4,614,354 | 9/1986 | Stagner | 280/491.5 X |
| 4,624,619 | 11/1986 | Uher | 414/537 |
| 4,685,857 | 8/1987 | Goeser et al. | 414/522 |
| 4,830,242 | 5/1989 | Painter | 296/26 X |
| 4,874,284 | 10/1989 | New, Jr. | 414/537 |
| 4,900,217 | 2/1990 | Nelson | 296/26 X |

FOREIGN PATENT DOCUMENTS 1251232 12/1960 France ..................... 296/26

*Primary Examiner*—David A. Bucci
*Attorney, Agent, or Firm*—Fleit, Jacobson, Cohn, Price, Holman & Stern

[57] ABSTRACT

A multiple use bed liner, loading ramps and ladder assembly for use with a pickup truck load carrying body capable of many selective arrangements to provide substantially universal use when associated with a pickup truck body. The assembly includes a rigid bed liner having a peripheral rigid frame supporting a tread plate or decking covering a substantial portion of the bottom of the pickup bed with the liner including rearwardly opening recesses to slidably receive a pair of loading ramps which can be moved from their stored position within the bed liner to an extended position to extend the length of the bed liner and pickup truck body and to an inclined position to serve as loading ramps capable of being used by various types of vehicles and also providing a walkway to facilitate access into the pickup truck body. Each of the ramps includes a ladder frame and a removable mesh panel so that the two ladder frames may be connected either in alignment or in a generally inverted U-shaped configuration to form a straight ladder or a modified stepladder. The bed liner when positioned in the pickup truck body provides a space for tool boxes, accessory boxes and the like between the side edges of the bed liner and the interior wall surfaces of the pickup truck body.

12 Claims, 2 Drawing Sheets

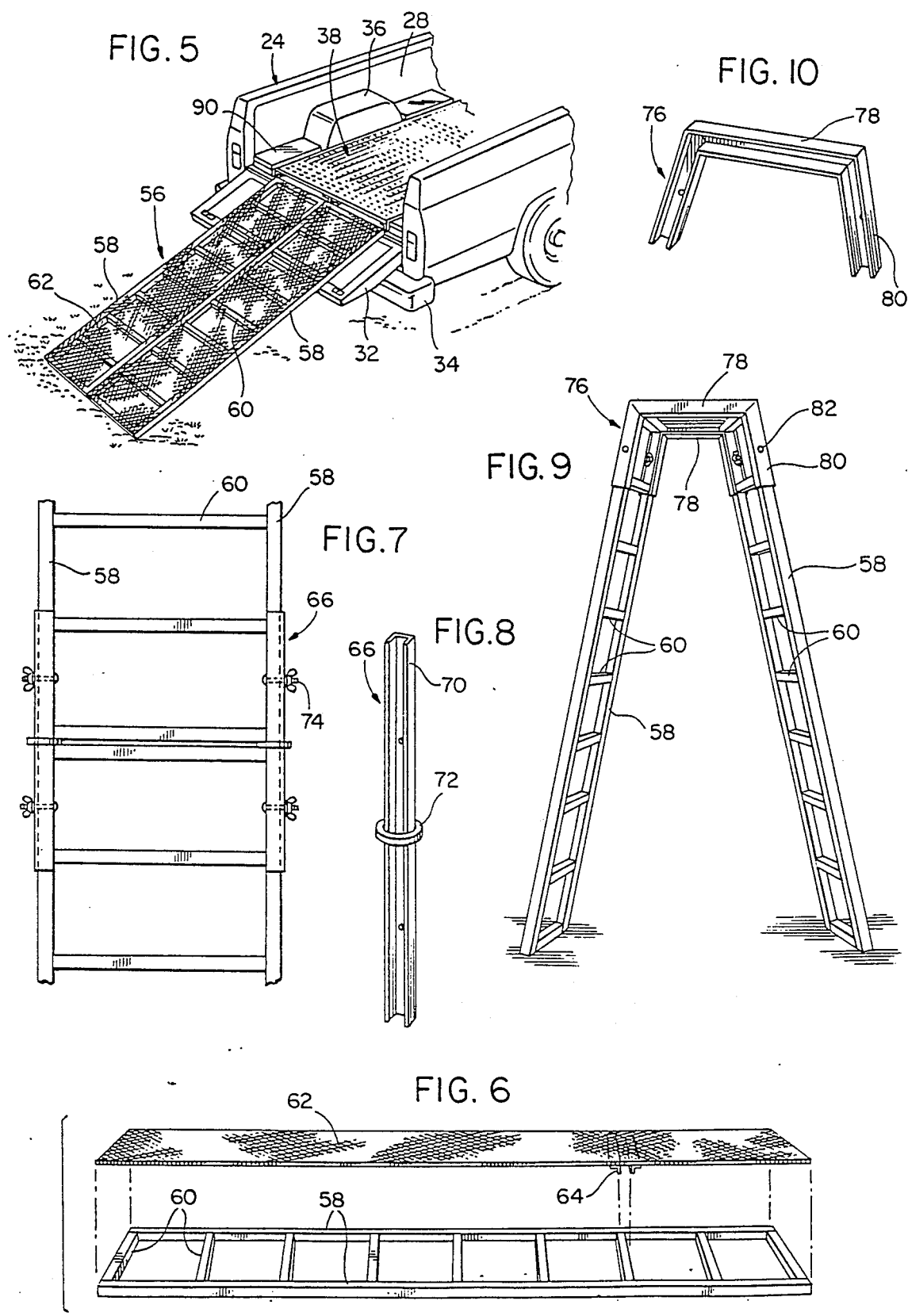

UNIVERSAL PICKUP TRUCK BED LINER, LOADING RAMP AND LADDER ASSEMBLY

BACKGROUND OF THE INVENTION

1. Field of the Invention

The present invention generally relates to a multiple use bed liner, loading ramps and ladder assembly for use with a pickup truck load carrying body capable of many selective arrangements to provide substantially universal use when associated with a pickup truck body. The assembly includes a rigid bed liner having a peripheral rigid frame supporting a tread plate or decking covering a substantial portion of the bottom of the pickup bed with the liner including rearwardly opening recesses to slidably receive a pair of loading ramps which can be moved from their stored position within the bed liner to an extended position to extend the length of the bed liner and pickup truck body and to an inclined position to serve as loading ramps capable of being used by various types of vehicles and also providing a walkway to facilitate access into the pickup truck body. Each of the ramps includes a ladder frame and a removable mesh panel so that the two ladder frames may be connected either in alignment or in a generally inverted U-shaped configuration to form a straight ladder or a modified stepladder. The bed liner when positioned in the pickup truck body provides a space for tool boxes, accessory boxes and the like between the side edges of the bed liner and the interior wall surfaces of the pickup truck body.

2. Information Disclosure Statement

Bed liners of flexible, resilient material for pickup truck bodies are well-known with such liners being of molded plastic or similar material and include side and end wall portions to cover and protect the side walls and front wall of the load carrying body of a pickup truck. Also, there have been provided loading ramps which extend rearwardly and downwardly from the rear edge of the pickup truck body so that vehicles such as lawn mowers, lawn tractors and similar vehicles can be easily loaded and also to provide a walkway to provide access to the pickup truck body. However, there does not exist a rigid bed liner which covers only the upwardly facing bottom surface of the pickup truck bed combined with load bed extensions and loading ramps which are stored within the confines of the bed liner when not in use. In addition, it is not known to provide loading ramps constructed with a ladder frame and a removable mesh panel so that the loading ramp or ramps can be used as a ladder in various assemblies depending upon the requirements of a user.

SUMMARY OF THE INVENTION

An object of the present invention is to provide a pickup truck bed liner, loading ramp and ladder assembly having substantially universal utility for increasing the efficiency and capabilities of a pickup truck with the bed liner including a rigid, hollow structure having a pair of rearwardly opening recesses or cavities formed therein for removably receiving elongated loading ramps which can be used as truck body extenders when oriented horizontally in rearwardly projecting relation from the bed liner, used as loading ramps when disposed in downwardly inclined relation in supporting arrangement with the ground surface or the like and used as various types of ladders when desired.

Another object of the invention is to provide an assembly as set forth in the preceding object in which each of the loading ramps is in the form of a ladder frame having a removable mesh panel mounted thereon to enable the loading ramp to be used as a short straight ladder, used as an elongated ladder by connecting the two frames together in longitudinal alignment, used as a tree ladder and used as a modified stepladder of generally inverted U-shaped configuration.

A further object of the invention is to provide an assembly as set forth in the preceding objects in which the bed liner includes a frame structure supporting a tread plate or deck that has dimensional characteristics substantially equal to the dimensions of a load bed on a pickup truck with the bed liner extending between the upwardly projecting wheel wells normally provided in pickup truck bodies with the space outwardly of the forward and rearward ends of the bed liner receiving a tool box or other accessory container.

A still further object of the invention is to provide a bed liner, loading ramp, ladder assembly as defined in the preceding objects capable of many uses and effectively increasing the utility of the pickup with the assembly being relatively simple in construction, easy to install permanently or temporarily and effective in its many uses and orientations.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 5 is a perspective view of the loading ramps positioned in extended and inclined position.

FIG. 6 is an exploded, perspective view of one of the loading ramps illustrating the ladder frame construction and removable mesh member.

FIG. 7 is an elevational view illustrating the manner of connecting the two ladder frames together to form a longer ladder.

FIG. 8 is a perspective view of the connector in FIG. 7.

FIG. 9 is a perspective view of the ladder frames connected together by a connector to retain them in inverted U-shaped configuration.

FIG. 10 is a perspective view of the connector in FIG. 9.

DESCRIPTION OF THE PREFERRED EMBODIMENT

Figure 1:
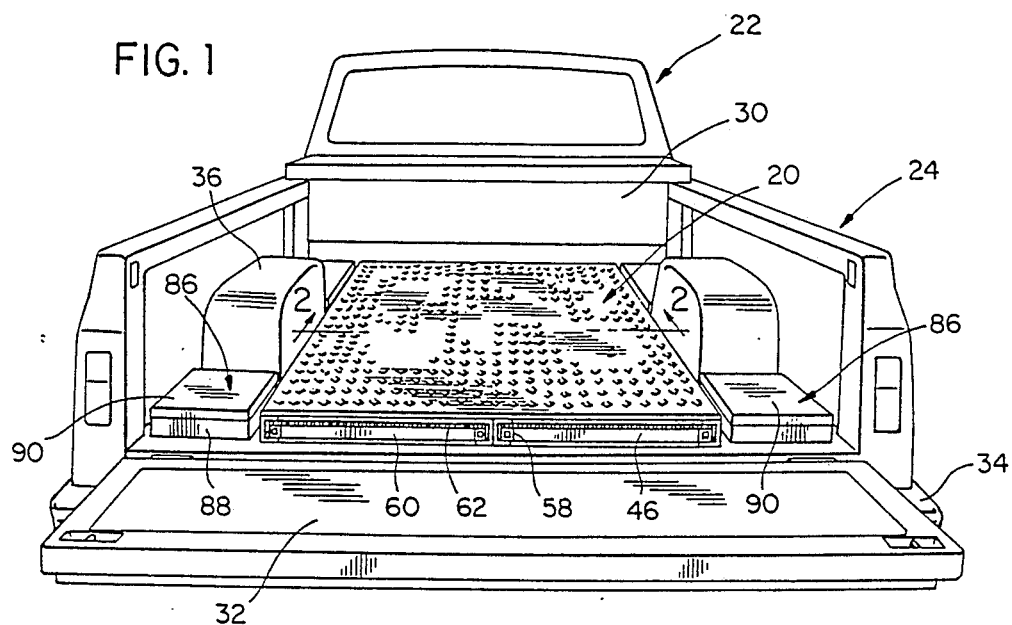
FIG. 1 is a rear perspective view of the present invention installed in a pickup truck body.

Referring now specifically to the drawings, the bed liner, loading ramp and ladder assembly is generally designated by reference numeral 20 and is illustrated in a conventional pickup truck 22 having a load body 24 defined by a bottom wall 26, upright side walls 28, a front wall 30 and a pivotal tailgate 32 positioned above a rear bumper 34 and retained in closed position but pivotal to an open position by conventional hinge and latch structures. The interior of the load bed 24 includes upwardly projecting wheel wells 36 which are disposed generally centrally of each side wall area of the load bed. The pickup truck is conventional and forms no specific part of the present invention except in its specific relation to the assembly 20 of this invention.

The assembly 20 includes a bed liner 38 that includes a pair of inwardly facing channel-shaped side rails 40, a pair of outwardly facing, abuttingly engaging center frame rails 42 that are rigidly connected to each other. The forward end of the frame rails 40 and 42 are interconnected by a front frame rail 44 to rigidify the structure with the rearward ends of the frame rails 40 and 42 defining a pair of parallel recesses or openings 46. The top of the bed liner 38 includes a tread plate or deck 48 in the form of a rigid metal plate having projections 50 formed thereon in a diamond pattern which is a conventional tread plate or deck plate structure to form an anti-slip surface. The inner edges of the frame rails 40 and 42 are connected by top and bottom strips 52 and 54 that are flush with the flanges of the channels and serve to reinforce the plate 48 and prevent the bottom flanges of the channel-shaped frame rails 40 and 42 from spreading apart when heavy loads are positioned on the bed liner.

While dimensions of the bed liner may vary, the overall dimensions may be approximately 4 × 8 to closely fit into a conventional pickup truck bed. The channels, tread plate and reinforcing strips may be constructed of aluminum or other lightweight, rigid material with the frame rails or channels 40 and 42 having a vertical height of approximately 2". While the bed liner may merely be rested on the bottom 26 of the pickup truck bed, it can also be quite easily bolted in place for permanent or semi-permanent installation. As illustrated in FIG. 1, the bed liner provides substantial protection for the floor 26 of the pickup truck bed and provides an anti-slip surface as the bottom of the load space formed by the pickup bed 24.

Figure 2:
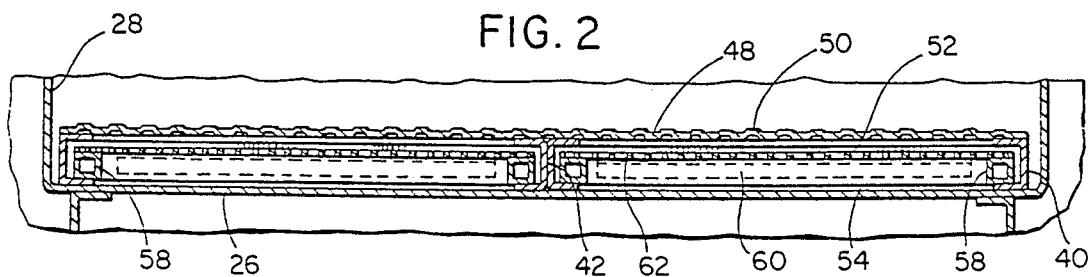
FIG. 2 is a transverse, sectional view taken substantially upon a plane passing along section line 2—2 on FIG. 1 illustrating the structure of the bed liner and the loading ramps and their relationship when the loading ramps are stored within the bed liner.

Positioned slidably in the bed liner 38 is a pair of loading ramps 56 with each loading ramp including a pair of tubular side rails 58 interconnected by a plurality of transverse tubular members 60 with the loading ramps 26 being stored within the spaces 46 with the side rails 58 being slidably engaged with the opposed inwardly facing channels 40 and 42, respectively, as illustrated in FIG. 2. The upper surface of each of the loading ramps 56 is formed by an expanded metal mesh panel 62 which is provided with a pair of depending flanges 64 in spaced parallel relation to each other adjacent to but spaced from one end thereof for removably positioning the mesh panel 62 on the loading ramp frame by engaging one of the transverse members 60 as illustrated in FIG. 6. Thus, the mesh panel can be selectively positioned on the loading ramp frame formed by the side members 58 and 60 so that small wheeled vehicles can be easily moved along the loading ramp and the loading ramp also provides a walkway to gain access into the interior of the pickup truck bed. When larger wheeled vehicles are being loaded or unloaded, the mesh panel 62 need not be used and can be stored in the spaces 46. In this use, the loading ramps are pulled outwardly and the outer ends thereof dropped downwardly to engage the ground surface and vehicles or other items can be moved along the loading ramps into or out of the load bed. As set forth, the mesh panel 62 is optionally used when loading vehicles and is removed when the load ramp frames formed by the side rails 58 and cross members 60 is used as a short straight ladder or used as an elongated ladder as illustrated in FIG. 7 by joining the two load ramp frames together by the use of an adapter generally designated by the numeral 66 and which includes an elongated channel-shaped member 70 having a central plate 72 with the channel-shaped member 70 engaging the adjacent ends of the side frame rails 58 and secured thereto by a fastening bolt 74. In this assembly, the central plate 72 abuts the adjacent ends of the side rails 58 to maintain them in slightly spaced relation and to provide a positive and secure connection between the side rails 58 so that an elongated ladder is provided which is as long as the two loading ramp frames. Thus, the loading ramps can be used not only to load and unload the load bed but also can be used as a short straight ladder or an elongated extension ladder by rigidly and fixedly and safely securing the two load ramp frames together.

The two ramp frames can also be assembled for use as a step ladder of inverted U-shaped configuration as illustrated in FIGS. 9 and 10 by utilizing connecting adapters 76 which are inwardly facing channel-shaped members of generally U-shaped configuration and including a bight portion 78 and diverging leg portions 80 which are formed as a continuous inwardly extending channel with a pair of the adapters being used and oriented in facing relation and receiving the upper ends of the side frame rails 58 as illustrated in FIG. 9 and being secured thereto by fastening bolts 82 thereby forming a rigid, inverted U-shaped step ladder. One of the loading ramp frames may be used with the two connector adapters 76 connected to the upper end thereof with the free ends of the two connector adapters then being capable of straddling a pole or a tree thereby enabling the ladder to be utilized as a tree stand when hunting.

Figure 3:
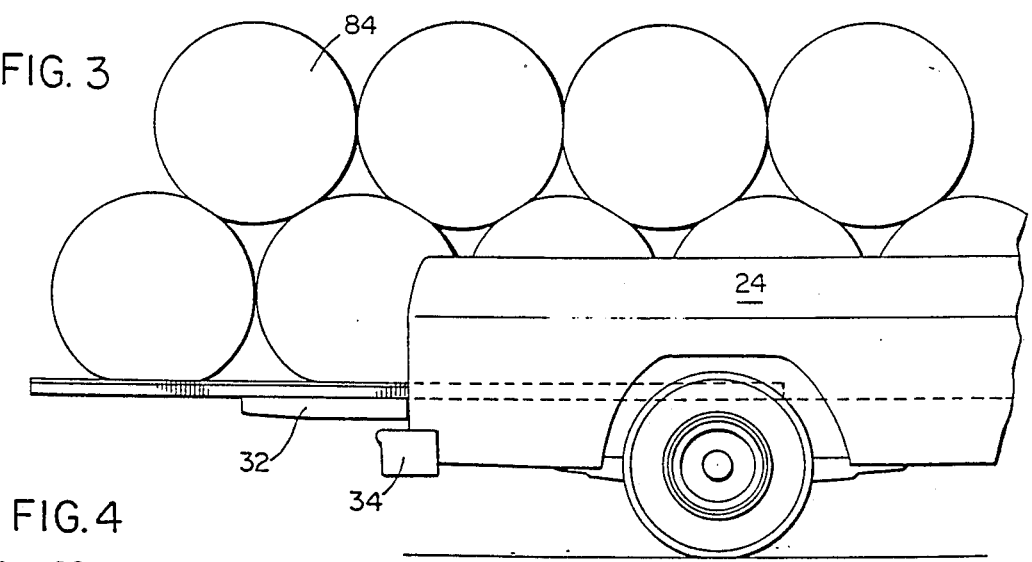
FIG. 3 is a schematic, side elevational view of the present invention utilized as a load bed extending device to enable the carrying capacity of the pickup truck to be increased.
Figure 4:
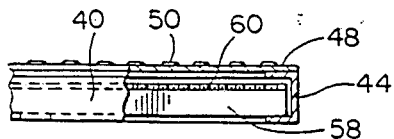
FIG. 4 is a fragmental view of the front end of the bed liner illustrating the closed front end thereof.

FIG. 3 illustrates the bed liner 38 in extended position to provide a load bed extender for bulky items such as rolled insulation 84. The load material on the forward end of the bed liner when extended will retain the bed liner in place and the maximum extension of the bed liner should be approximately ½ of its length or approximately 4 ft. thereby increasing the payload capabilities of the pickup truck especially when relatively lightweight, bulky items are being carried. Likewise, the bed liner can be partially extended to serve as a workbench for various purposes in order to support a workpiece at a more comfortable height. For example, if lumber or other wood components are being cut by handsaw, powersaw or the like, the extended workbench provides a more effective work area for individuals using the device.

A plurality of accessory boxes, tool boxes or the like 86 may be positioned alongside the bed liner both forwardly and rearwardly of the wheel wells 36 as illustrated in FIG. 1. The boxes 86 are about the same height as the bed liner 20 and include a lower portion 88 and a pivotal or removable lid 90. The accessory boxes, tool boxes or the like may be used to store various tools and also store the accessories such as the connectors 66 and 76 so that all of the components are available to convert the load ramps to a straight 8 ft. ladder, a straight 16 ft. ladder, an 8 ft. step ladder and an 8 or 16 ft. tree ladder or tree stand.

Figure 11:
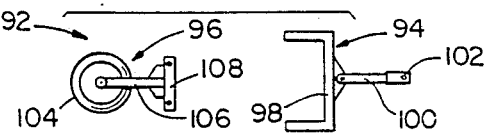
FIG. 11 is a plan view of a kit to convert a ladder frame to a utility trailer.

As illustrated in FIG. 11, a kit 92 is provided to convert one of the ramps 56 to a utility trailer. The kit includes a hitch 94 and two identical wheel assemblies 96. The hitch 94 includes a U-shaped frame 98 which is detachably bolted to the end portions of the tubular side rails 58. The hitch also includes a forwardly extending tongue 100 rigid with the frame and provided with a hitch member 102 at its outer end. Each wheel assembly 96 includes a wheel 104 rotatably supported by a vertical leg 106 and a horizontal bracket 108 which is detachably bolted to a side rail 58 remote from the hitch 94 thereby providing an effective two-wheel utility trailer. The components of the kit are also stored in the accessory boxes 86.

By using the assembly of the present invention, all advantages of its universality can be realized since the present invention is capable of performing many tasks and also capable of multiple uses and purposes. The assembly is constructed of high quality, noncorrosive, rust resistant and attractive aluminum material that can be annodized so that the color is compatible with the color of the pickup truck. The assembly of the present invention is of lightweight construction but yet simple in construction requiring very little or no maintenance or care and there are no attachments or small parts that may become lost thus requiring replacement. If the bed liner is permanently installed or semi-permanently installed, only two small bolts and nuts are needed to fasten the bed liner to the pickup truck bed. The bed liner only takes up approximately 2 in. of depth in the pickup bed and it can be left in the pickup bed at all times in a permanent manner without hampering any other loading or hauling need thus enabling the pickup truck to be used in a conventional manner even when the bed liner assembly is installed.

The accessory containers may be provided with lockable covers or drawers to enable items of value to be securely retained in the containers and also retained out of sight. The loading ramps 56 when used with the trailer hitch 94 and wheel assemblies 96 enable one of the 8 ft. loading ramps to be converted to a lightweight 8 ft. trailer to pull behind a lawn tractor, riding lawnmower or ATV. Also, the bed liner provides a solid 4×8 foot metal top portable workbench, picnic table, sleeping area and the like thus further enhancing the universality of the invention.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A pickup truck bed liner, loading ramp and ladder assembly comprising a rigid, generally rectangular bed liner for a pickup truck bed having a rear end with a tailgate, said liner including a load supporting surface adapted to cover substantially the entire area between wheel wells on the truck bed, frame means extending downwardly from the periphery of the load supporting surface to engage the pickup truck bed and support the load supporting surface in spaced relation to the pickup truck bed to form a storage space, said frame means having an open end, said open end of the frame means facing to the rear end of the pickup truck bed and providing access to the storage space under the load supporting surface when the pickup tailgate is in an open position, and ramp means slidably positioned through the open end of the frame means for positioning in stored relation in the storage space below the load supporting surface of the liner and movement rearwardly to a downwardly inclined position toward a ground surface at the rear end of the pickup truck bed to provide a ramp from the ground surface to the load supporting surface of the liner, said ramp means comprising a frame having parallel side rails and a plurality of spaced cross rails to provide a ladder structure capable of use as a ramp for the bed liner and as a ladder structure, said ramp means including a mesh panel overlying the side rails and cross rails and means detachably connecting the mesh panel to the ramp means, said means connecting the mesh panel to the ramp means including a depending rigid channel-shaped cleat mounted on the undersurface of the mesh panel in downwardly telescoping relation to one of said cross rails to position the mesh panel on the ramp means to enable removal of the mesh panel when desired for use of the ramp means as a ladder or as a ramp for vehicles having large wheels, said load supporting surface being a tread plate having projections on the upper surface thereof to enhance traction, said bed liner frame means including a pair of inwardly facing, channel-shaped parallel side rails, a pair of centrally disposed, outwardly facing channel-shaped center rails secured in back-to-back relation and facing the side rails to form two parallel spaces in underlying relation to the load supporting surface, said ramp means including two ramps with the ramps being individually slidable into the spaces.

2. The assembly as defined in claim 1 wherein the end of the bed liner frame means positioned inwardly of the pickup truck bed is closed by a frame rail.

3. The assembly as defined in claim 2 wherein the facing frame rails have opposed top and bottom flanges with opposed parallel edges, reinforcing strips interconnecting said opposed edges with the upper reinforcing strips underlying the tread plate and the lower reinforcing strips being spaced from each other to maintain the parallelism of the channel-shaped rails.

4. The assembly as defined in claim 3 together with accessory containers positioned alongside the bed liner.

5. The assembly as defined in claim 3 together with connector means for connecting adjacent ramp frames together to form a ladder.

6. The assembly as defined in claim 5 wherein said connector means includes a pair of channel-shaped connectors which are straight and secured to aligned ramp frames to form an elongated ladder.

7. The assembly as defined in claim 5 wherein said connector means includes a pair of U-shaped channel-shaped connectors engaging and secured to end portions of a pair of upwardly inclined load ramps to form a generally U-shaped step ladder.

8. The assembly as defined in claim 7 wherein said connectors of U-shaped configuration straddle a tree or similar structure to position the ladder in relation thereto.

9. The assembly as defined in claim 5 wherein said connector means are stored in the accessory containers.

10. A loading rap for a pickup truck bed comprising a generally rectangular frame defined by parallel side rails and parallel cross rails perpendicular to the side rails and rigidly connected therewith to form a ladder-type frame to extend from a supporting ground surface to a rear edge portion of a pickup truck bed and for use as a ladder structure to enable a user to climb to an elevated position, a mesh panel completely overlying one side of the ladder frame, means releasably mounting the mesh panel on the frame to enable the mesh panel to form a loading ramp for vehicles having small wheels and a loading ramp for walking users of the pickup truck bed with the mesh panel being removable to enable the use of the ladder frame as a ladder, and a kit to convert the frame to a utility trailer, said kit including a hitch and two wheel assemblies, said hitch being connected to on end of the frame, said wheel assemblies being connected to and depending from the side portions of the other end of the frame.

11. A truck bed liner and loading ramp assembly comprising a rigid, generally rectangular bed line for positioning on and covering a substantial portion of a truck bed, said liner including a load supporting surface having a rearward end generally in alignment with a rearward end of the truck bed, frame means extending downwardly from the periphery of the load supporting surface to engage the truck bed and support the load supporting surface in spaced relation to the truck bed to form a storage space, a rearward end of the frame means being open, said open end of the frame means providing access to the storage space under the load supporting surface, and ramp means slidably positioned through the open end of the frame means for positioning in stored position in the storage space under the load supporting surface and for movement rearwardly to a downwardly inclined position at the rearward end portion of the load supporting surface to provide a ramp from a ground surface to the load supporting surface of the liner, said ramp means comprising a ramp including a frame having rigid parallel side rails and a plurality of spaced, rigid cross rails interconnecting the side rails to provide access to the load supporting surface, said ramp including a mesh panel overlying the side rails and cross rails, said bed liner frame means including a pair of parallel side rails, a pair of centrally disposed, parallel center rails in spaced relation to the side rails to form two parallel storage spaces in underlying relation to the load supporting surface, said ramp means including two ramps with the ramps being individually slidable into the storage spaces.

12. The assembly as defined in claim 11 wherein the frame rails are interconnected by upper and lower reinforcing strips, the upper reinforcing strips being spaced from each other and underlying the mesh panel, the lower reinforcing strips being spaced from each other to maintain the parallelism of the rails.

* * * * *